United States Patent
Uetake

(10) Patent No.: US 8,657,048 B2
(45) Date of Patent: Feb. 25, 2014

(54) HYDRAULIC EXCAVATOR

(75) Inventor: Masaaki Uetake, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/700,392

(22) PCT Filed: May 24, 2012

(86) PCT No.: PCT/JP2012/063250
§ 371 (c)(1),
(2), (4) Date: Nov. 27, 2012

(87) PCT Pub. No.: WO2013/018422
PCT Pub. Date: Feb. 7, 2013

(65) Prior Publication Data
US 2013/0216344 A1    Aug. 22, 2013

(30) Foreign Application Priority Data
Jul. 29, 2011    (JP) .................................. 2011-166228

(51) Int. Cl.
*B60K 11/08*    (2006.01)
(52) U.S. Cl.
USPC ....... 180/68.1; 180/89.17; 454/195; 454/277; 280/847
(58) Field of Classification Search
USPC ............... 180/68.1, 68.2, 69.2, 69.24, 89.17; 165/41, 72–75; 454/146, 147, 149, 454/195, 221, 277, 309; 280/847, 848; 123/41.48, 41.58; 296/146.1; 49/70, 49/73.1, 74.1, 501
See application file for complete search history.

(56) References Cited

U.S. PATENT DOCUMENTS

| | | | | |
|---|---|---|---|---|
| 1,883,464 A | * | 10/1932 | Ball | 454/149 |
| 3,292,521 A | * | 12/1966 | Requa | 454/133 |
| 3,788,418 A | * | 1/1974 | Clancy et al. | 180/68.4 |
| 6,019,161 A | * | 2/2000 | Travis | 165/41 |
| 6,032,620 A | * | 3/2000 | Tsukiana et al. | 123/41.48 |
| 6,901,903 B2 | * | 6/2005 | Nakajima et al. | 123/198 E |
| 7,717,218 B2 | * | 5/2010 | Matsumoto et al. | 180/291 |
| 7,753,152 B2 | * | 7/2010 | Nakae et al. | 180/68.1 |
| 7,828,097 B2 | * | 11/2010 | Kondou et al. | 180/68.1 |
| 2008/0029321 A1 | * | 2/2008 | Kurtz et al. | 180/69.2 |
| 2008/0169142 A1 | * | 7/2008 | Kinoshita et al. | 180/68.1 |
| 2009/0260906 A1 | * | 10/2009 | Hartland et al. | 180/68.3 |
| 2010/0236855 A1 | * | 9/2010 | Matsushita et al. | 180/69.2 |

FOREIGN PATENT DOCUMENTS

| | | | | |
|---|---|---|---|---|
| JP | 8-183350 | A | | 7/1996 |
| JP | 2003-3519 | A | | 1/2003 |
| JP | 2003003520 | A | * | 1/2003 |
| JP | 2003-129847 | A | | 5/2003 |
| JP | 2005-325590 | A | | 11/2005 |

* cited by examiner

*Primary Examiner* — J. Allen Shriver, II
*Assistant Examiner* — Steve Clemmons
(74) *Attorney, Agent, or Firm* — Global IP Counselors, LLP

(57) ABSTRACT

A hydraulic excavator includes a lower travel body, an upper swiveling body, an exterior door, and a louver. The upper swiveling body has a swiveling platform and a frame with a lower end part of the frame being secured to the swiveling platform, the upper swiveling body being swivelably supported by the lower travel body. The exterior door has a curved part in which an opening is formed. The exterior door is openably/closably supported by the frame of the upper swiveling body. The louver blocks the opening in the exterior door in a closed state, and the louver is mounted in the frame of the upper swiveling body.

7 Claims, 6 Drawing Sheets

HYDRAULIC EXCAVATOR

CROSS-REFERENCE TO RELATED APPLICATIONS

This application claims priority to Japanese Patent Application No. 2011-166228 filed on Jul. 29, 2011, the disclosure of which is hereby incorporated herein by reference in its entirety.

TECHNICAL FIELD

The present invention relates to a hydraulic excavator, and particularly to louver structure for an exterior door provided to the hydraulic excavator.

BACKGROUND ART

Hydraulic excavators are equipped with a radiator for cooling engine coolant, an oil cooler for cooling hydraulic oil of hydraulic apparatuses, an aftercooler for cooling compressed air to be fed to the engine, and/or various other cooling devices.

The plurality of cooling devices are disposed in a side surface of the vehicle body in the hydraulic excavator. An exterior door is provided so as to cover the plurality of cooling devices. An opening for directing cooling air to the cooling device is formed in the exterior door, and a louver for determining the direction in which air flows is installed in the opening so that rain, dust, and other matter is prevented from entering.

For example, in the hydraulic excavator described in Japanese Laid-open Patent Application No. 2003-3519, the cooling devices are disposed in the side surface of the vehicle body; the side door and engine hood are provided for covering these cooling devices, and apart from these, a lid is provided for covering the area above the screen. An opening for taking in outside air is formed in the side door or the like. The hydraulic excavator described in Japanese Laid-open Patent Application No. 2005-325590 is described as having configuration in which a louver is provided in the opening formed in the exterior door.

SUMMARY

The move toward hybrids in recent years is progressing in hydraulic excavators as well. In such hybrid hydraulic excavators, a radiator (herein referred to as "hybrid radiator") for cooling the inverter and other electromotor systems is required in addition to the plurality of conventional cooling devices. Accordingly; cooling air must be fed at a higher rate in comparison with conventional devices, and degradation in the heat balance must be prevented.

In this case, the exterior door generally has a flat surface part in which an opening as an air intake port is formed, and a curved surface part formed on the upper part of the flat surface part. It is possible to consider forming an opening in the curved portion of the exterior door in order to increase air intake. In the case that an opening is thus formed in the curved portion, the opening in the curved part must be blocked off by a louver similar to the louver for blocking off the opening in the flat portion.

In the case that an opening is formed in the curved part of the exterior door and a louver for blocking off the opening is secured to the curved part, the louver bracket must be secured to the peripheral part of the opening by welding or the like. However, there may be cases in which the bracket cannot be welded due to manufacturing error in the curved surface part. Therefore, it is difficult to secure the louver to the curved surface part. The same problem occurs even when a rectilinear sloped part, rather than a curved part, is formed in the upper part of the exterior door.

Also, in the case that two louvers are secured to the exterior door, the overall weight of the exterior door is increased and the strength of the hinge portion for supporting the exterior door must be increased, which leads to higher cost.

An object of the present invention is to make it possible to form a larger opening so that sufficient air can be taken in from the exterior door, and to make it possible to block the opening with a louver without the bracket being welded to the curved surface part of the exterior door.

The hydraulic excavator according to a first aspect comprises a lower travel body, an upper swiveling body, an exterior door, and a louver. The upper swiveling body has a swiveling platform and a frame with a lower end part of the frame being secured to the swiveling platform, the upper swiveling body being swivelably supported by the lower travel body. The exterior door has a curved part in which an opening has been formed, the exterior door being openably/closably supported by the frame of the upper swiveling body. The louver blocks the opening in the exterior door in a closed state, the louver being mounted in the frame of the upper swiveling body.

In this case, the opening is formed in the curved part of the exterior door. Therefore, an opening is also formed in the flat surface part in the same manner as conventional configurations, whereby an opening that is wider than a conventional opening can be formed and a greater amount of air can be taken in from the exterior. Since the louver for blocking off the opening of the curved part is mounted in the frame of the upper swiveling body, the configuration of the exterior door is simplified. Also, installation of the louver is facilitated.

In this configuration, the louver remains on the frame side even when the exterior door is opened. However, the opening of the curve surface part generally has a small surface area, and the surface area occupied by the louver for blocking off the opening is therefore small. Accordingly, the louver does not become an obstacle when constituent components disposed inside the exterior door are accessed.

The hydraulic excavator according to a second aspect is the hydraulic excavator according to the first aspect, wherein the frame has a first vertical frame and a second vertical frame, and an upper frame. The first vertical frame and a second vertical frame extend upward and are disposed with a gap therebetween, the lower end parts thereof being secured to the swiveling platform. An upper frame is detachably disposed on the first and second vertical frames, between the upper end part of the first vertical frame and the upper end part of the second vertical frame. The louver is secured to the upper frame and is detachable from the first and second vertical frame together with the upper frame.

Here, the louver is mounted in the upper frame constituting the frame. There may be cases in which a replacement component is disposed below the upper frame. When the replacement component is of considerable weight, the replacement component must be attached and detached using a lift, and there may be cases in which the upper frame and the louver mounted therein become an impediment to replacement work.

In view of the above, in the second aspect, the louver is secured to the upper frame, the louver and the upper frame can be dismounted as a unit from the other frames. Therefore, the louver does not become an impediment to component replacement work.

The hydraulic excavator according to a third aspect is the hydraulic excavator according to the second aspect, wherein the louver further comprises a first bracket and a second bracket disposed between the first vertical frame and the second vertical frame, and a plurality of vanes in which one end is secured to the first bracket and the other end is secured to the second bracket. The upper end part of the first bracket is secured to one end of the upper frame on the first vertical frame side, and the upper end part of the second bracket is secured to the other end of the upper frame on the second vertical frame side.

In this case, two brackets constituting the louver are secured to the upper frame, and a plurality of vanes are secured between the two brackets. Accordingly, the louver can be reliably secured to the upper frame in a stable orientation.

The hydraulic excavator according to a fourth aspect is the hydraulic excavator according to any of the first to third aspects, wherein the exterior door further comprises a flat surface part formed by an even surface below the curved surface part; and an opening part different from the opening formed in the curved surface part is formed in the flat surface part. The hydraulic excavator is further provided with a louver mounted in the exterior door to block off the opening of the flat surface part.

In this case, a large amount of air cat be taken in by making effective use of the entire exterior door.

The hydraulic excavator according to a fifth aspect is the hydraulic excavator according to the first aspect, wherein the frame has a first vertical frame and a second vertical frame, and an upper frame. The first vertical frame and the second vertical frame are disposed with a gap therebetween, and the lower end parts thereof being secured to the swiveling platform and extending upward. The upper frame is detachably disposed on the first and second vertical frames, between the upper end part of the first vertical frame and the upper end part of the second vertical frame. The louver is supported by the first vertical frame and the second vertical frame.

In this case, a louver is not required to be mounted on the exterior door side because the louver is secured to the first and second vertical frames. Also, the louver does not interfere with work when a component disposed below the upper frame is to be replaced, because the upper frame and the louver can be removed from the first and second vertical frames.

The hydraulic excavator according to a sixth aspect the hydraulic excavator according to any of the first to fifth aspects, further comprising a cooling unit supported by the upper swiveling body and disposed in a position facing the opening formed in the flat surface part and the curved surface part.

In this case, the ability to cool the cooling unit can be improved because air taken in from the two openings is fed to the cooling unit.

The hydraulic excavator according to a seventh aspect is the hydraulic excavator according to any of the first to sixth aspects, further comprising a replacement component supported by the upper swiveling body and disposed below the upper frame.

In this case, replacement work is facilitated because the louver and the upper frame can be removed in replacement work for replacing a battery or other replacement component.

In the present invention as described above, sufficient air can be taken in from the exterior door in a hydraulic excavator, and the bracket is not required to be welded to the curved surface part of the exterior door. Work efficiency is not compromised when the exterior door is opened to perform work.

DETAILED DESCRIPTION OF EMBODIMENTS

Overall Configuration

Figure 1:
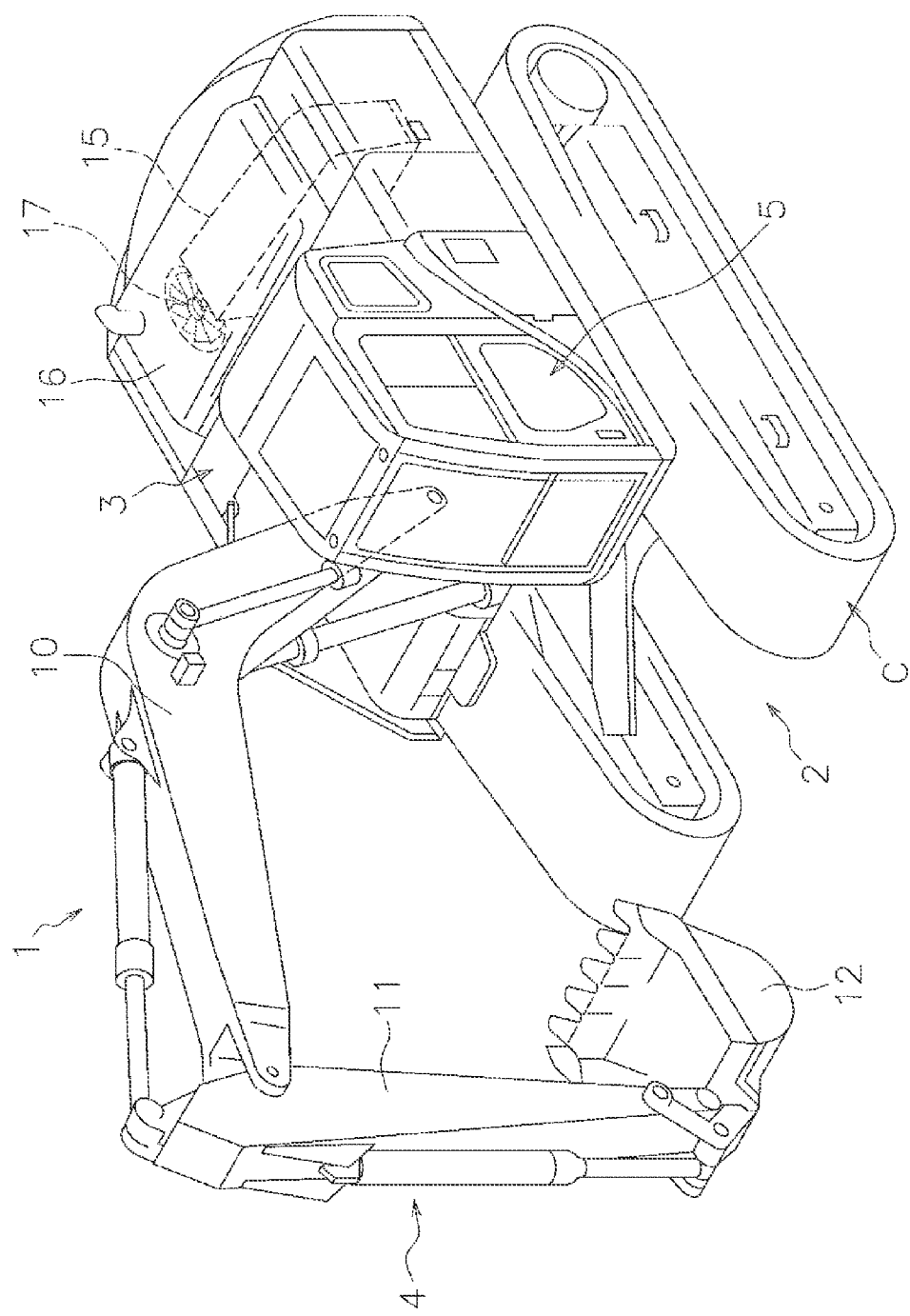
FIG. 1 is a perspective view of the external appearance of a hybrid hydraulic excavator according to an embodiment of the present invention.

The hydraulic excavator 1 according to an embodiment of the present invention is shown FIG. 1. The hydraulic excavator 1 is a hybrid hydraulic excavator, and is provided with a swivel electric motor, a power generation motor, an inverter as a converter, a capacitor for storing an electric charge, a diesel engine, and the like. In this hybrid hydraulic excavator 1, energy generated when swiveling of the vehicle body decelerates is converted into electrical energy, and the electrical energy obtained in together with the energy of the power generation motor directly connected to the engine is stored in the capacitor. The stored electrical energy is used as auxiliary energy during engine acceleration by way of the power generation motor. Hereinbelow, the terms "front," "rear," "left," and "right" are directions determined by reference to an operator seated in the driver's seat.

The hydraulic excavator 1 shown in FIG. 1 is provided with a lower travel body 2, an upper swiveling body 3, a work implement 4, and a cab 5.

The lower travel body 2 has a pair of crawler belts C on the left and right sides, and travel is made possible by driving the crawler belts C. The upper swiveling body 3 is swivelably supported by the lower travel body 2, and swiveling in an arbitrary direction is made possible by a swivel electric motor (not shown). The work implement 4 and the cab 5 are equipped on the upper swiveling body 3. The work implement 4 has a boom 10, an arm 11, and a bucket 12. The work implement 4 has a plurality of hydraulic cylinders for driving the constituent members 10 to 12.

Also, an engine 15 is disposed in a transverse arrangement in the rear part of the upper swiveling body 3. In other words, a crankshaft (not shown) of the engine 15 is disposed so as to be substantially orthogonal to the front-rear direction of the hydraulic excavator 1. The engine 15 is covered by an engine cover and/or an exterior cover 16 arranged above the engine cover. A cooling fan 17 rotated by the engine 15 is provided to the distal end part (right end part) of the engine 15.

Figure 2:
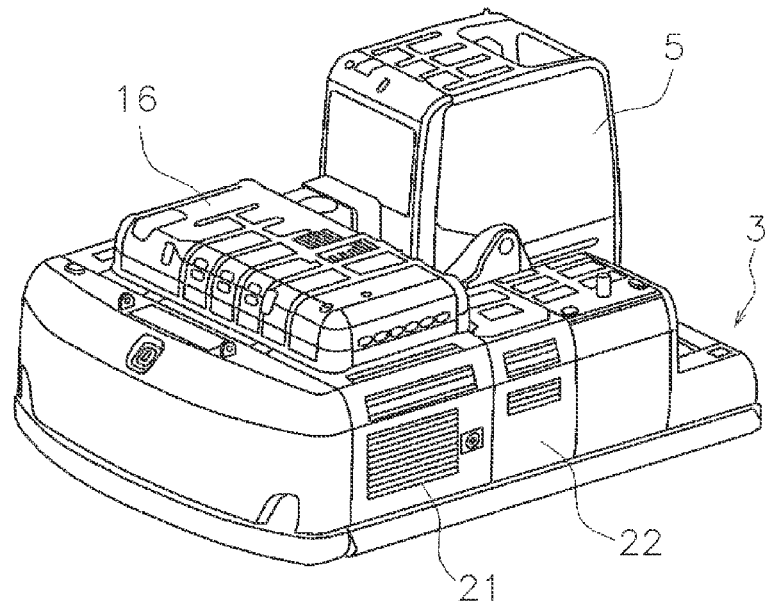
FIG. 2 is a perspective view of the external appearance as seen from rear of a part of the upper swiveling body of the hydraulic excavator in FIG. 1.

A rearward exterior door 21 and a forward exterior door 22 are openably/closably provided to the right-side end part of the rear part of the upper swiveling body 3, as shown in FIG. 2. In FIG. 2, only the upper swiveling body 3 is shown and other configurations are omitted.

Exterior Door and Configuration Related Thereto

Figure 3:
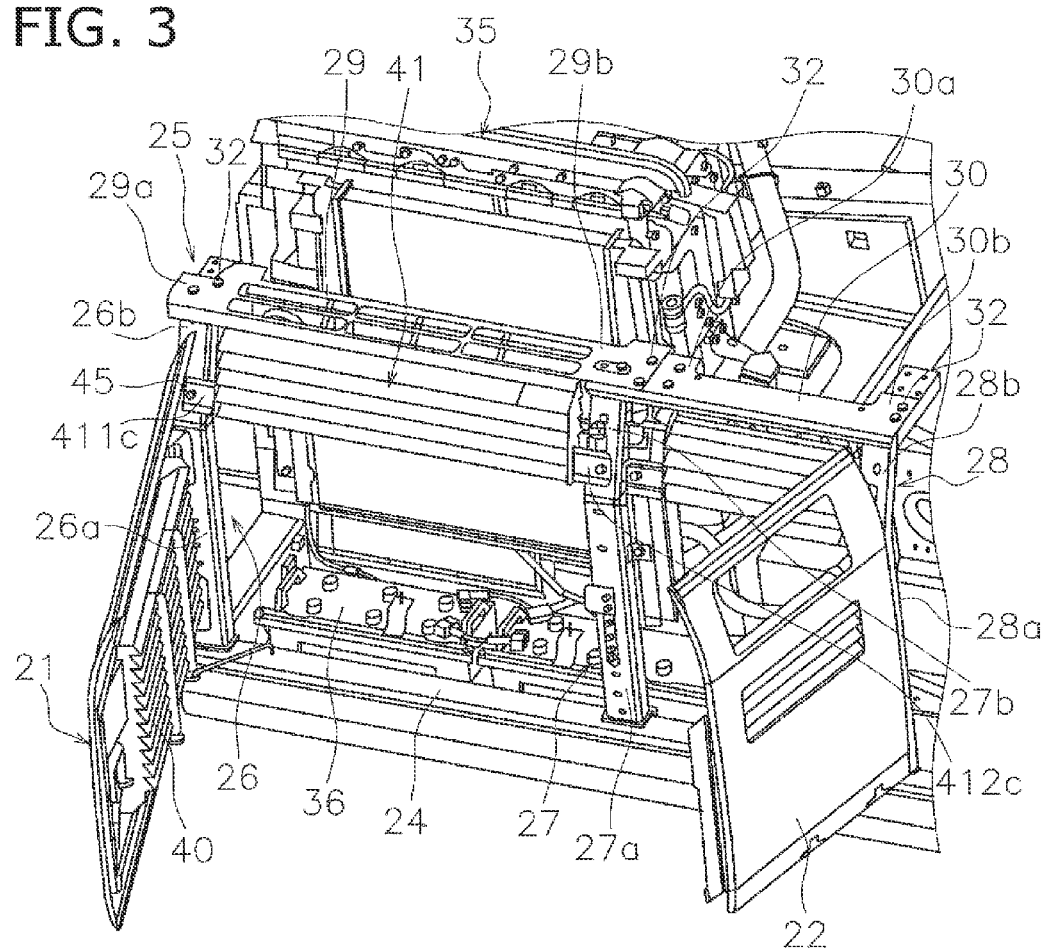
FIG. 3 is a perspective view of the external appearance for describing the exterior door and the configuration related to the exterior door.

FIG. 3 shows the rearward exterior door 21 and the forward exterior door 22, and the extracted configuration related to the rearward exterior door 21 and the forward exterior door 22. The upper swiveling body 3 has a swiveling platform 24 and a frame 25, as shown in FIG. 3. The frame 25 has first to third vertical frames 26, 27, 28, and first and second upper frames 29, 30.

The lower end parts of the first to third vertical frames 26, 27, 28 are secured to the side part of the swiveling platform 24. The portions (vertical parts) 26a, 27a, 28a, excluding the upper end parts, of vertical frames 26, 27, 28 extend substantially vertically upward from the swiveling platform 24, and the upper parts (sloped parts) 26b, 27b, 28b slope inward toward the vehicle body. The first vertical frame 26 is disposed most rearward, the second vertical frame 27 is disposed with a predetermined gap forward from the first vertical frame 26. The third vertical frame 28 is disposed with a predetermined gap forward from the second vertical frame 27. The gap between the first vertical frame 26 and the second vertical frame 27 is set so as to be greater than the gap between the second vertical frame 27 and the third vertical frame 28.

The first upper frame 29 extends in the front-rear direction, a rear end part 29a is secured by a bolt 32 to the upper end surface of the first vertical frame 26, and a front end part 29b is secured by a bolt 32 to the upper end surface of the second vertical frame 27. The second upper frame 30 also extends in the front-rear direction, a rear end part 30a is secured by a bolt 32 to the upper end surface of the second vertical frame 26 together with the front end part 29b of the first upper frame 29, and a front end part 30b is secured by a bolt 32 to the upper end surface of the third vertical frame 28.

It is apparent from the above that the first upper frame 29 and the second upper frame 30 can be freely attached to or detached from the first to third vertical frames 26 to 28 by removing or tightening the bolts 32.

The rearward exterior door 21 is provided between the first vertical frame 26 and the second vertical frame 27, and the forward exterior door 22 is provided between the second vertical frame 27 and the third vertical frame 28. The rearward side part of the rearward exterior door 21 is openably/closably supported by hinges (not shown) on the first vertical frame 26. The forward side part of the forward exterior door 22 is supported by hinges (not shown) on the third vertical frame 28.

A cooling unit 35 is disposed in the rear part of the swiveling platform 24, as shown in FIG. 3. The cooling unit 35 has a radiator for cooling engine coolant, an oil cooler for cooling hydraulic oil, an aftercooter for cooling compressed air to be fed to the engine, a hybrid radiator for cooling the inverter and other electromotor systems, and a condenser for an air conditioner. A plurality of batteries 36 used as replaceable components are mounted below the first upper frame 29 and to the side of the cooling unit 35.

Details of Exterior Door

Figure 4:
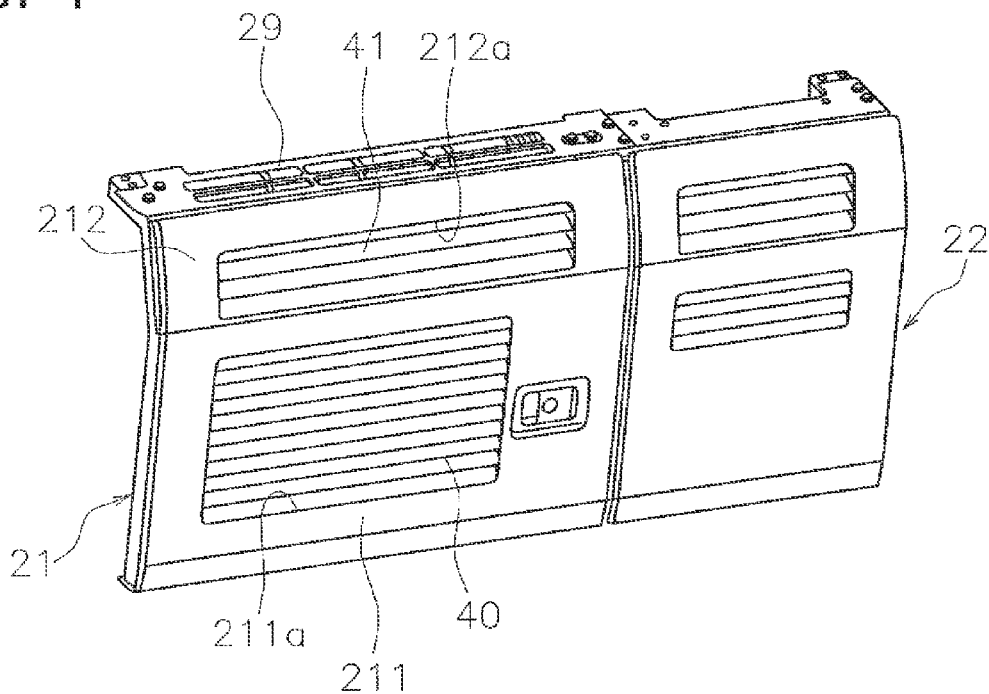
FIG. 4 is a perspective view of the external appearance of the exterior door.

FIG. 4 shows the exterior doors 21, 22. The rearward exterior door 21, the forward exterior door 22, and the configurations related thereto are essentially the same. Therefore, the rearward exterior door 21 and the configuration related thereto will be described.

The rearward exterior door 21 has a flat surface part 211 that occupies substantially two-thirds of the area below in the vertical direction, and a curved surface part 212 formed above the flat surface part 211. The flat surface part 211 faces the vertical parts 26a, 27a of the first and second vertical frames 26, 27, and the curved surface part 212 faces the sloped parts 26b, 27b of the first and second vertical frames 26, 27. The flat surface part 211 has a flat surface part that stands substantially vertically erect, and has a main opening 211a. The curved surface part 212 has a curved surface that extends arcuately upward and inward toward the vehicle body from the upper end of the flat surface part 211, and has an accessory opening 212a. The accessory opening 212a has a smaller opening surface area than the main opening 211a.

Louver

The main opening 211a and the accessory opening 212a are covered by a main louver 40 and an accessory louver 41 in a closed state of the rearward exterior door 21, as shown in FIG. 4. The main louver 40 and the accessory louver 41 are members for inhibiting the ingress of rain, dust, and other foreign matter and determining the direction of air flow. The louvers 40, 41 are different in external appearance and shape, but have essentially the same configuration. It is apparent from FIG. 3 that the main louver 40 is secured to the inner surface (the surface on the vehicle body side) of the rearward exterior door 21, and that the accessory louver 41 is secured to the frame 25. The shape and structure of the main louver 40, and securing structure to the rearward exterior door 21 are completely the same as a conventional shape and structure, and a description thereof is omitted. The accessory louver 41 and the securing structure thereof are described below in detail.

Figure 5:
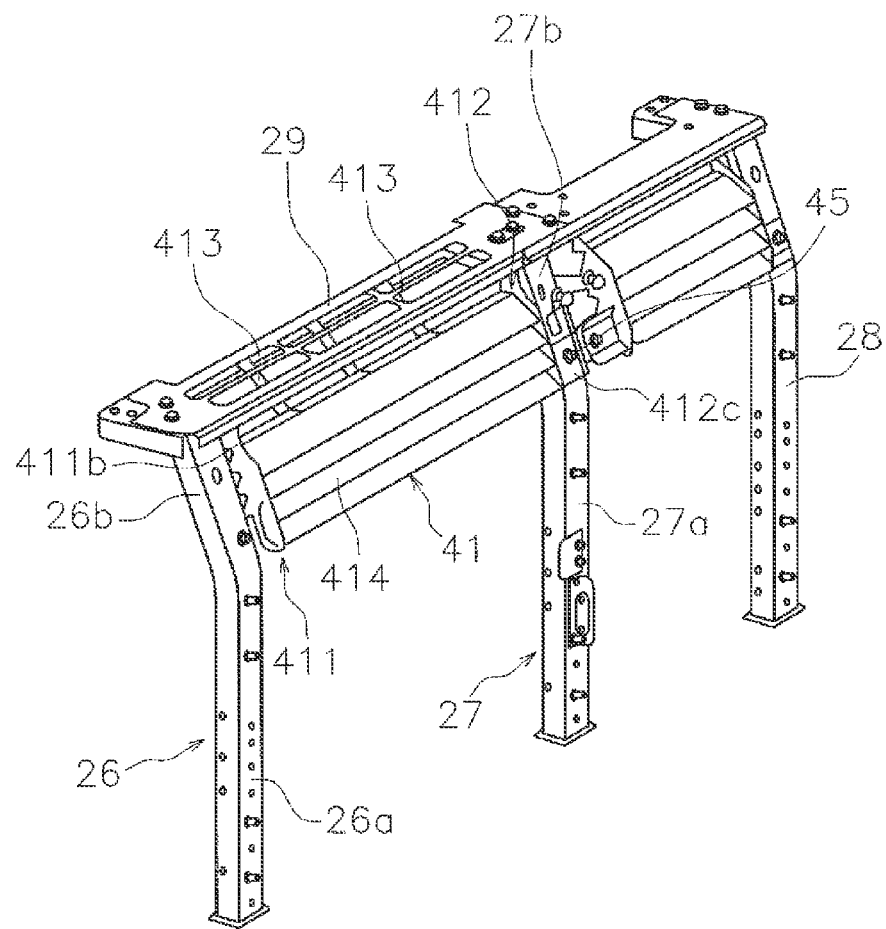
FIG. 5 is a perspective view of the external appearance shows a frame and an accessory louver.

The accessory louver 41 is disposed along the sloped parts 26b, 27b and the first and second vertical frames 26, 27 between the first vertical frame 26 and the second vertical frame 27, as shown in FIG. 5. The accessory louver 41 has a first end bracket 411 and a second end bracket 412, a plurality of intermediate brackets 413, and a plurality of vanes 414. The louvers for the forward exterior door 22 have only end brackets and are not provided with intermediate brackets.

Figure 6:
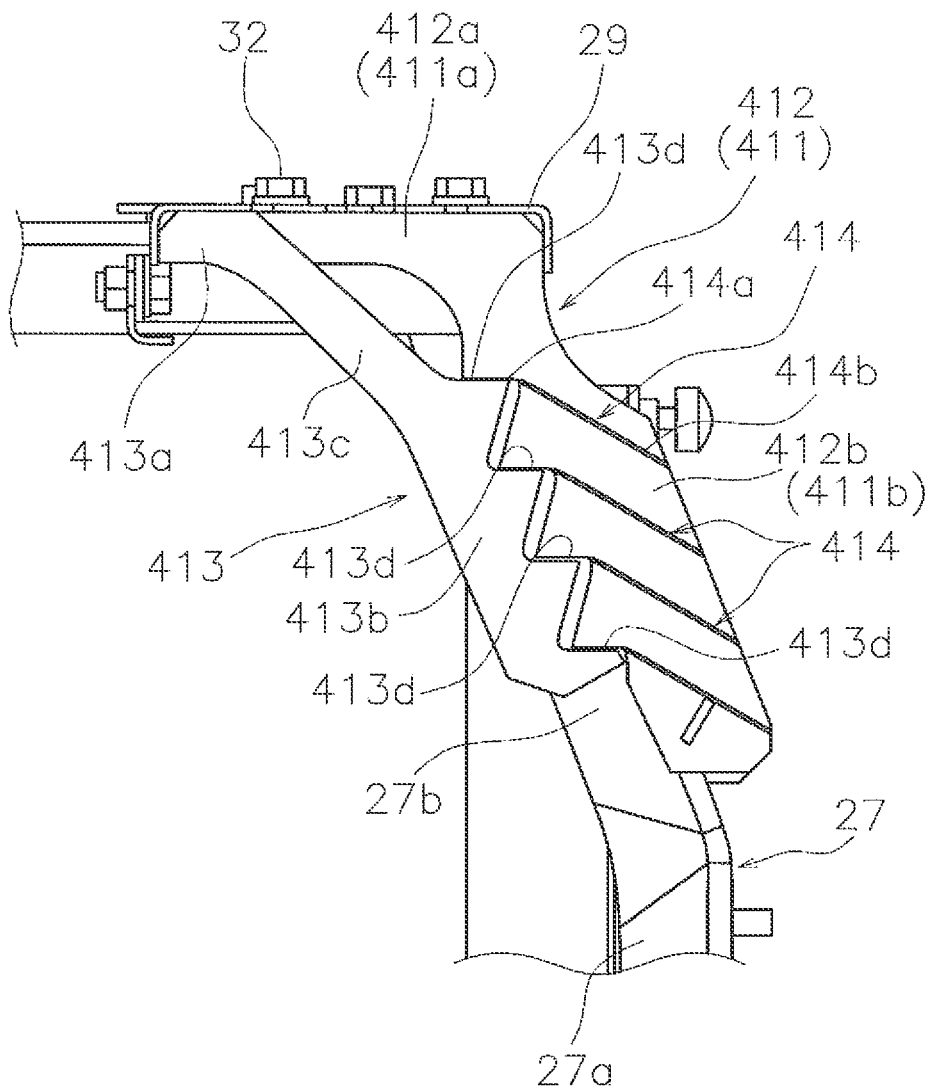
FIG. 6 is a cross-sectional view of the upper frame and the accessory louver.

The first end bracket 411 and the second end bracket 412 are disposed between the first vertical frame 26 and the second vertical frame 27, the first end bracket 411 is disposed adjacent to the first vertical frame 26, and the second end bracket 412 is disposed. adjacent to the second vertical frame 27. The two end brackets 411, 412 are plate-shaped members that extend in the vertical direction, and have an upper secured part 412a (only the second end bracket 412 is shown in FIG. 6, but the first end bracket 411 has completely the same configuration) parallel to the first upper frame (hereafter merely referred to as "upper frame") 29, and a vane securing part 412b that extends from the upper secured part 412a downward along the sloped part 27b of the second vertical frame 27, as shown in FIGS. 5 and 6. The lower end parts of the vane securing parts 411b, 412b of the end brackets 411, 412 have lateral securing parts 411c, 412c that protrude rearward and forward, respectively, as shown in FIG. 3 (a portion of the drawing is omitted in FIG. 5).

The plurality of intermediate brackets 413 are plate-shaped members that extend in the vertical direction in similar fashion to the end brackets 411, 412, and have an upper secured part 413a, a vane securing part 413b that extends along the sloped parts 26b, 27b of the vertical frames 26, 27, and a coupling part 413c for coupling the two securing parts 413a, 413b. The portions of the vane securing part 413b on the outer side of the vehicle body are formed in a stepped shape having a plurality of horizontal surfaces 413d.

Each of the plurality of vanes 414 is a strip-shaped member extending in the front-rear direction, and has a substantially horizontal secured part 414a and a main part 414b extending diagonally downward from the secured part 414a, as shown in FIG. 6. The rear end surface of the vanes 414 is welded to the front-side surface of the vane-plate securing part 411b of the first end bracket 411, and the front end surface is welded to the rear-side surface of the vane-plate securing part 412b of the second end bracket 412. The secured part 414a of the vanes 414 is welded to the horizontal surface 413d, which is the portion formed in a stepped shape on the plurality of intermediate brackets 413.

As described above, the two end brackets 411, 412, the plurality of intermediate brackets 413, and the plurality of vanes 414 are secured to each other by welding and formed into unit to constitute a single accessory louver 41. The upper surface of upper securing parts 411a, 412a, 413a of the end brackets 411, 412 and the intermediate brackets 413, and the lower surface of the upper frame 29 are welded together. The lateral securing parts 411c, 412c of the two end brackets 411, 412 are detachably mounted on the corresponding vertical frames 26, 27 using bolts 45. The accessory louver 41 is thereby integrated with the upper frame 29 and freely attached to and detached from the vertical frames 26, 27.

As described above, the configuration of the forward exterior door 22 is essentially the same as the configuration of the rearward exterior door 21, except for the dimensions. The accessory louver for blocking off the accessory opening of the forward exterior door 22 and the installation structure the accessory louver are essentially the same as the accessory louver 41 and the installation structure thereof in the rearward exterior door 21.

In the rearward exterior door 21, a main opening 211a is formed in the flat surface part 211, and an accessory opening 212a is formed in the curved surface part 212. Therefore, a greater amount of air can be taken in when compared with a conventional structure. Consequently, the heat balance can be improved in a hybrid hydraulic excavator that requires a hybrid radiator.

The accessory louver 41 for blocking off the accessory opening 212a is secured to the frame 25 side rather than to the rearward exterior door 21, a bracket is therefore not required when the accessory louver 41 is provided to the rearward exterior door 21. Also, the weight of the rearward exterior door 21 is not increased. Furthermore, the accessory louver 41 can be readily and stably secured for the same reason. Since the accessory louver 41 is secured to the frame 25 side, the accessory louver 41 remains in the vehicle body side when the rearward exterior door 21 is opened. However, the accessory louver 41 does not become an impediment when internal constituent components are accessed, because the surface area occupied by the accessory louver 41 is relatively small.

Figure 7:
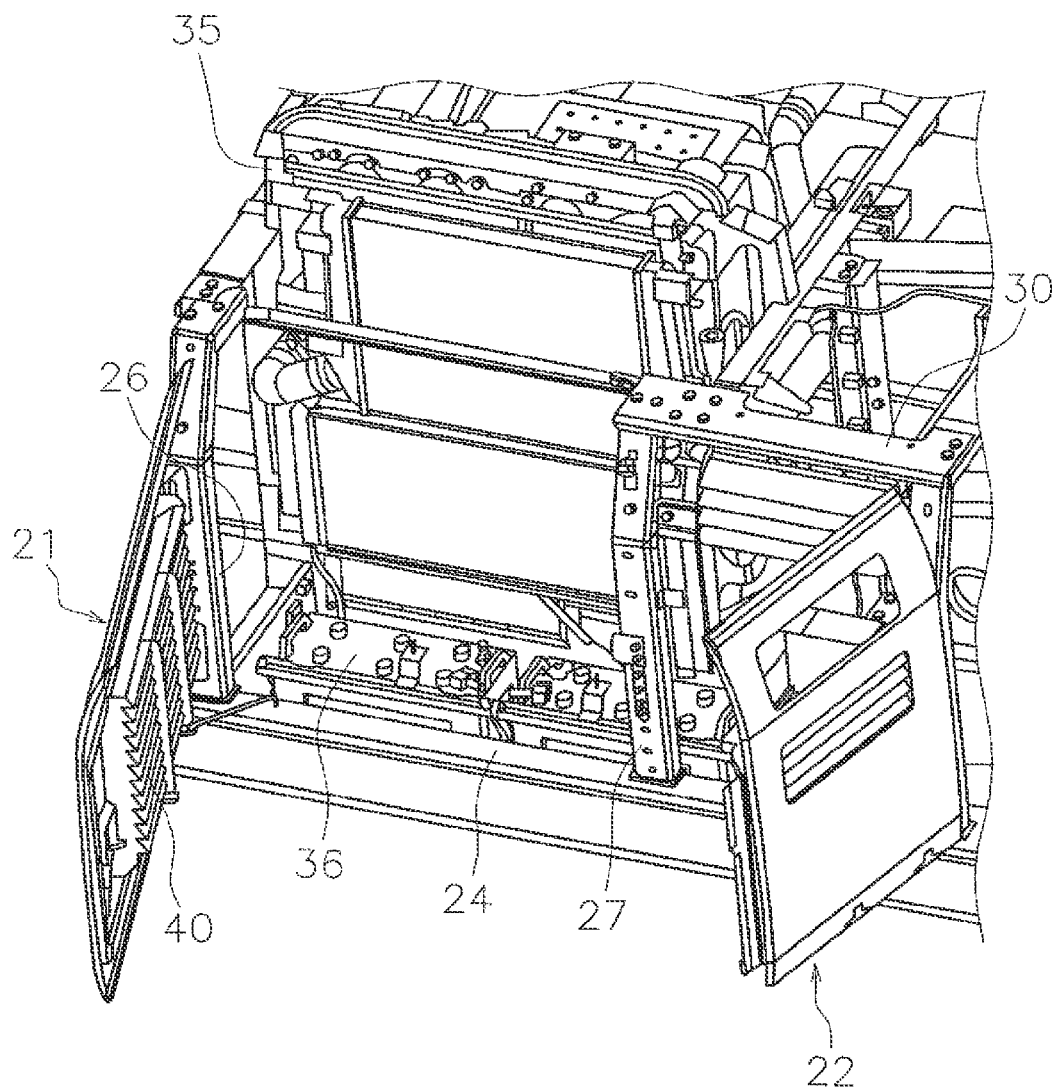
FIG. 7 is the view of FIG. 3 with the upper frame and the accessory louver removed.

When a battery is to be replaced, the battery 36 is detached and attached using a lift because the battery 36 is heavy. At this time, it is possible to remove the bolts 32 that secure the upper frame 29 to the vertical frames 26, 27, and bolts 45 that secure the end brackets 411, 412 at the two ends of the accessory louver 41 to the vertical frames 26, 27, whereby the upper frame 29 and the accessory louver 41 can be integrally dismounted. FIG. 7 shows a state in which the upper frame 29 and the accessory louver 41 have been dismounted. Therefore, the accessory louver 41 does not interfere with work when the battery 36 is to be replaced.

OTHER EMBODIMENTS

The present invention is not limited to an embodiment such as that described above; various modifications and corrections can be made without departing from the scope of the invention.

Figure 8:
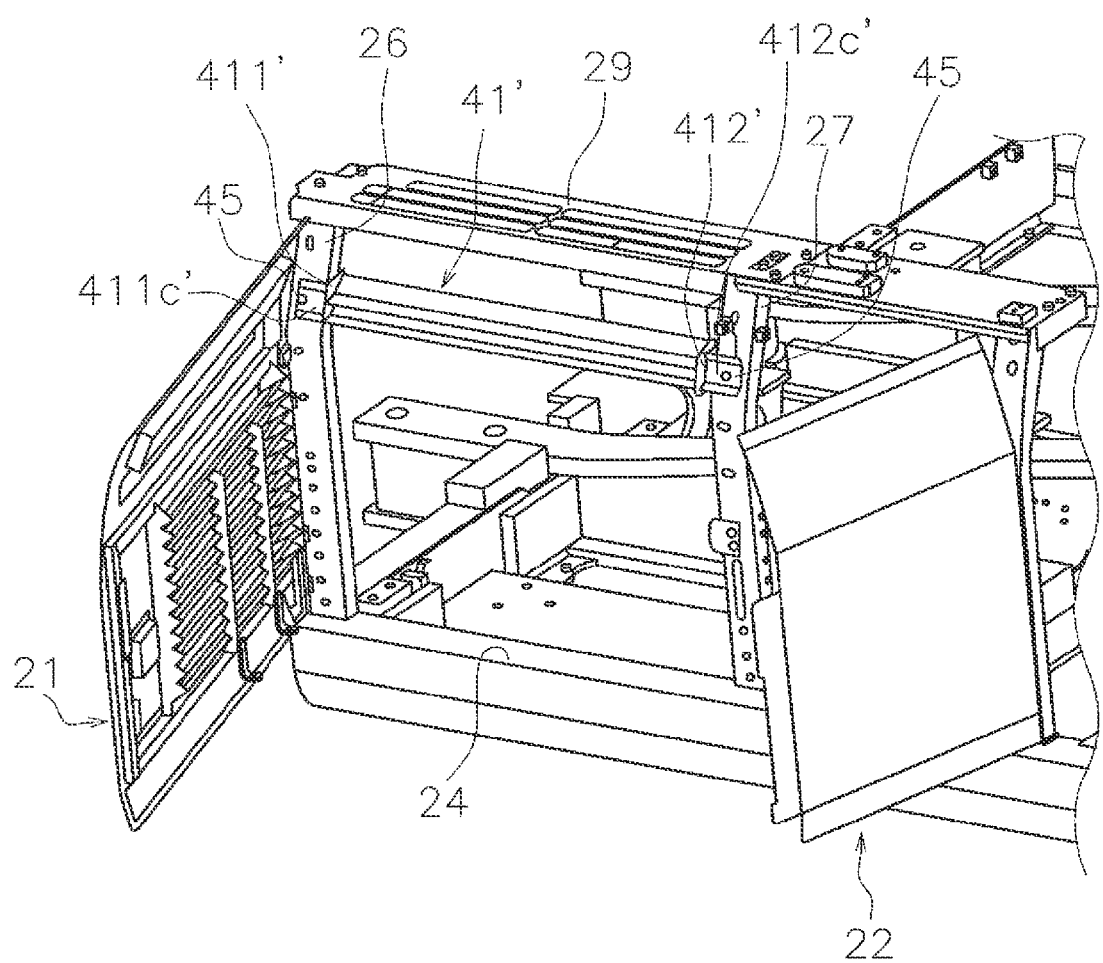
FIG. 8 is a view of another embodiment of the present invention and corresponds to FIG. 3.

(a) In the embodiment described above, an example was shown in which the accessory louver is integrated with the first upper frame, but the disposition of the accessory louver is not limited to the embodiment. An accessory louver 41' may be secured to the first and second vertical frames 26, 27, as shown in FIG. 8. In another embodiment shown in FIG. 8, the configuration of the accessory louver 41' itself is the same as the embodiment described above. However, the end brackets 411', 412' and the intermediate brackets are not welded to the first upper frame 29. The lateral securing parts 411'c, 412'c of the end brackets 411', 412' are mounted to the first vertical frame 26 and the second vertical frame 27 using bolts 45.

In the embodiment shown in FIG. 8, the first upper frame 29 and the accessory louver 41' must be separately dismounted from the vertical frames 26, 27, but otherwise the same effect as that of the embodiment described above is obtained.

(b) In the embodiment described above, the present invention was applied to the rearward exterior door and the forward exterior door, but the present invention may be applied to only one of the doors.

(c) An example having a flat surface part and a curved surface part was shown as the shape of the exterior door, but the present invention may also be similarly applied even when the curved surface part is sloped in a rectilinear fashion.

(d) In the embodiment described above, the exterior door is disposed on the side of the vehicle body, but the present invention may also be similarly applied even when the exterior door is provided to the rear part of the vehicle body.

In a hydraulic excavator according to the illustrated embodiments, sufficient air can be taken in from the exterior door, and a bracket is not required to be welded to the curved surface part of the exterior door. Work efficiency is not compromised when the exterior door is opened to perform work.

The invention claimed is:

1. A hydraulic excavator comprising:
a lower travel body;
an upper swiveling body having a swiveling platform and a frame with a lower end part of the frame being secured to the swiveling platform, the upper swiveling body being swivelably supported by the lower travel body;
an exterior door having a curved part in which an opening is formed, the exterior door being openably/closably supported by the frame of the upper swiveling body; and
a louver for blocking the opening in the exterior door in a closed state, the louver being mounted in the frame of the upper swiveling body;
the frame having a first vertical frame and a second vertical frame disposed with a gap therebetween, each of the first and second vertical frames being arranged to extend upward with a lower end part thereof secured to the swiveling platform and an upper part thereof having a sloped part that slopes inward toward a vehicle body,
the louver being disposed along the sloped parts of the first and second vertical frames.

2. The hydraulic excavator as recited in claim 1, wherein the frame has:
an upper frame detachably disposed on the first and second vertical frames, between an upper end part of the first vertical frame and an upper end part of the second vertical frame, the louver is secured to the upper frame and detachable from the first and second vertical frame together with the upper frame.

3. The hydraulic excavator as recited in claim 2, wherein the louver further includes
   a first bracket and a second bracket that are disposed between the first vertical frame and the second vertical frame and have upper secured parts and vane securing parts, the upper secured parts being parallel to the upper frames and the vane securing parts extending downward along the sloped parts of the vertical frames from the upper secured parts, and
   a plurality of vanes, one end of each of the vanes being secured to the vane securing part of the first bracket and the other end being secured to the vane securing part of the second bracket; and
the upper secured part of the first bracket is secured to one end of the upper frame on the first vertical frame side, and the upper secured part of the second bracket is secured to the other end of the upper frame on the second vertical frame side.

4. The hydraulic excavator as recited in claim 1, wherein the exterior door further includes a flat surface part formed by an even surface below the curved surface part;
   an opening different from the opening formed in the curved surface part is formed in the flat surface part; and
   the hydraulic excavator further includes a louver for blocking the opening of the flat surface part, the louver being mounted in the exterior door.

5. The hydraulic excavator as recited in claim 1, wherein the frame has:
   an upper frame detachably disposed on the first and second vertical frames, between an upper end part of the first vertical frame and an upper end part of the second vertical frame,
   the louver is supported by the first vertical frame and the second vertical frame.

6. The hydraulic excavator as recited in claim 4, further comprising
   a cooling unit supported by the upper swiveling body and disposed in a position facing the openings formed in the flat surface part and the curved surface part.

7. The hydraulic excavator as recited in claim 1, further comprising
   a replacement component supported by the upper swiveling body and disposed below the upper frame.

* * * * *